(12) United States Patent
Choi et al.

(10) Patent No.: US 6,714,267 B2
(45) Date of Patent: Mar. 30, 2004

(54) LIQUID CRYSTAL DISPLAY DEVICE AND FABRICATING METHOD THEREOF

(75) Inventors: Seung Kyu Choi, Taegu-kwangyokshi (KR); Chul Woo Im, Kyoungsangbuk-do (KR)

(73) Assignee: LG. Philips LCD. Co., Ltd., Seoul (KR)

( * ) Notice: Subject to any disclaimer, the term of this patent is extended or adjusted under 35 U.S.C. 154(b) by 0 days.

(21) Appl. No.: 10/303,856

(22) Filed: Nov. 26, 2002

(65) Prior Publication Data

US 2003/0122981 A1 Jul. 3, 2003

(30) Foreign Application Priority Data

Dec. 29, 2001 (KR) ...................................... P2001-87849

(51) Int. Cl.⁷ .................................................. G02F 1/13
(52) U.S. Cl. .............................. 349/43; 349/39; 257/59
(58) Field of Search ....................... 349/43, 39; 257/59, 257/72

(56) References Cited

U.S. PATENT DOCUMENTS 5,883,682 A * 3/1999 Kim et al. ..................... 349/43
6,323,917 B1 * 11/2001 Fujikawa et al. ............. 349/43

* cited by examiner

*Primary Examiner*—James A. Dudek
(74) *Attorney, Agent, or Firm*—Birch, Stewart, Kolasch & Birch, LLP

(57) ABSTRACT

Disclosed is a liquid crystal display device and fabricating method thereof to increase a capacitance of a storage capacitor as well as stabilize performance of a thin film transistor. The present invention includes a gate electrode and a gate line on a substrate, an insulating layer on the gate electrode and gate line wherein the insulating layer on the gate line is thinner than the insulating layer on the gate electrode, an active layer formed on the gate electrode so as to leave the insulating layer therebetween, source and drain electrodes on the active layer, and a capacitor electrode formed on the gate line.

15 Claims, 6 Drawing Sheets

LIQUID CRYSTAL DISPLAY DEVICE AND FABRICATING METHOD THEREOF

This application claims the benefit of the Korean Application No. P2001-87849 filed on Dec. 29, 2001, which is hereby incorporated by reference.

BACKGROUND OF THE INVENTION

1. Field of the Invention

The present invention relates to a liquid crystal display device, and more particularly, to a liquid crystal display device and fabricating method thereof to prevent the generation of afterimage and flickers by increasing a capacitance of a storage capacitor.

2. Discussion of the Related Art

A liquid crystal display device has characteristics of low-voltage driving, low power consumption, full-color realization, lightness and compact size, and the like, thereby becoming applicable to TV, aircraft monitors, PDA and mobile phones, as well as calculators, watches, notebook computers, and personal computers.

Generally, a liquid crystal display device includes a thin film transistor substrate having thin film transistors and pixel electrodes in pixel areas defined by gate and data lines, respectively, a color filter substrate having a color filter layer and a common electrode, and a liquid crystal layer inserted between the two substrates.

In order to drive such a liquid crystal display device, a thin film transistor switches an electrical signal and liquid crystals realize an image in accordance with the signal. Thus, in order to realize a stable image when a liquid crystal display device is driven, the liquid crystals should also be driven while the thin film transistor is turned off. To achieve this, while the thin film transistor is turned on, electric charges are accumulated on a storage capacitor. However, if a capacitance of the storage capacitor charged with the electric charges is not sufficient, afterimage and flickers occur on a screen.

A structure of a liquid crystal display device and a fabricating method thereof according to a related art device are explained by referring to the attached drawings as follows.

Referring to FIG. 1, a unit cell of a liquid crystal display device according to a related art device includes gate and data lines 102a and 150 crossing each other on a substrate (not shown) and a pixel electrode 108 formed in a pixel area defined by the gate and data lines 102a and 150.

Moreover, the unit cell of the liquid crystal display device further includes a drain electrode 106b connected to the pixel electrode 108 through a contact hole 107a and a capacitor electrode 106c over the gate line 102a. In this case, the capacitor electrode 106c is connected to the pixel electrode 108 through the other contact hole 107b.

Referring to FIG. 2A, in order to form a unit cell of a liquid crystal display device having the above-explained structure, first of all, a gate electrode 102 and a gate line 102a are formed on a substrate 100.

Subsequently, a gate insulating layer 103 is formed on the gate electrode 102 and gate line 102a. An active layer 104 and an ohmic contact layer 105 are formed on the gate insulating layer 103 overlapped with the gate electrode 102. In this case, a thickness of the gate insulating layer 103 is even all over the gate electrode 102, gate line 102a, and substrate 100.

Referring to FIG. 2B, source and drain electrodes 106a and 106b are formed on the ohmic contact layer 105. A capacitor electrode 106c is simultaneously formed with the same material forming the source and drain electrodes 106a and 106b on the gate insulating layer 103 overlapped with the gate line 102a.

In this case, the capacitor electrode 106c, gate line 102a, and the gate insulating layer 103 between the capacitor electrode 106c and gate line 102a constitute a storage capacitor. Hence, the thickness of the gate insulating layer 103 becomes an important variable for capacitance of the storage capacitor. Particularly, if the gate insulating layer 103 is thick, the capacitance of the storage capacitor is reduced so as to generate afterimage and flickers on a screen. Yet, if the gate insulating layer 103 is formed thin to increase the capacitance of the storage capacitor, a parasitic capacitance is generated from the thin film transistor including the gate electrode 102, source and drain electrodes 106a and 106b, and the gate insulating layer 103 between them. Hence, the thin film transistor becomes unstable.

Referring to FIG. 2C, a passivation layer 107 having contact holes 107a and 107b is formed on an entire surface of the structure.

Referring to FIG. 2D, a pixel electrode 108 is formed on the passivation layer 107 using ITO(indium tin oxide).

In this case, the drain electrode 106b and pixel electrode 108 are electrically connected to each other through the contact hole 107a, and the capacitor electrode 106c and pixel electrode 108 are electrically connected to each other through the other contact hole('107b' in FIG. 1).

Unfortunately, the liquid crystal according to the related art has the following problem or disadvantage.

If the gate insulating layer is thick, the capacitance of the storage capacitor is decreased so as to generate the afterimage and flickers on the screen. On the contrary, if the gate insulating layer is formed thin so as to increase the capacitance of the storage capacitor, performance of the thin film transistor becomes unstable.

SUMMARY OF THE INVENTION

Accordingly, the present invention is directed to a liquid crystal display device and fabricating method thereof that substantially obviates one or more problems due to limitations and disadvantages of the related art.

An object of the present invention is to provide a liquid crystal display device and fabricating method thereof to increase a capacitance of a storage capacitor as well as stabilize performance of a thin film transistor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device according to the present invention includes a gate electrode and a gate line on a substrate, a gate insulating layer covering the gate electrode, gate line, and substrate, an active layer formed over the gate electrode so as to leave the gate insulating layer therebetween, source and drain electrodes on the active layer, a capacitor electrode formed over the gate line so as to leave the gate insulating layer therebetween, a passivation layer on the drain and capacitor electrodes so as to have contact holes, and a pixel electrode on the passivation layer.

Preferably, a thickness of the gate insulating layer under the active layer is twice as thick than the thickness of the insulating layer in another area.

More preferably, the gate insulating layer under the active layer is about 4,000 Å thick.

More preferably, the gate insulating layer in another area is about 2,000 Å thick.

Preferably, the liquid crystal display device further includes an ohmic contact layer between the source/drain electrodes and the active layer.

In a further aspect of the present invention, a method of fabricating a liquid crystal display device includes the steps of forming a gate electrode and a gate line on a substrate, depositing a gate insulating layer on the gate electrode, gate line, and the substrate, forming an active layer on the gate insulating layer over the gate electrode, etching the gate insulating layer to a predetermined thickness in all other areas except an area under the active layer, and forming source and drain electrodes on the active area and a capacitor electrode on the gate insulating layer over the gate line.

Preferably, the gate insulating layer is deposited about 4,000 Å thick.

Preferably, the step of forming the active layer includes the steps of depositing a polysilicon layer on an entire surface of the gate insulating layer, forming a photoresist pattern on the polysilicon layer, and etching the polysilicon layer selectively using the photoresist pattern as a mask.

More preferably, the polysilicon is etched by a dry etch technique.

Preferably, the gate insulating layer in the rest of the areas except the area under the active layer is etched by a dry etch technique.

Preferably, the gate insulating layer in the rest of the areas except the area under the active layer is etched so as to be 2,000 Å thick.

Preferably, the method further includes the step of forming an ohmic contact layer on the active layer.

Preferably, the method further includes the steps of forming a passivation layer on the source, drain, and capacitor electrodes and forming a pixel electrode on the passivation layer.

More preferably, a first contact hole for connecting the drain and pixel electrodes to each other and a second contact hole for connecting the capacitor and pixel electrodes to each other are formed in the passivation layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
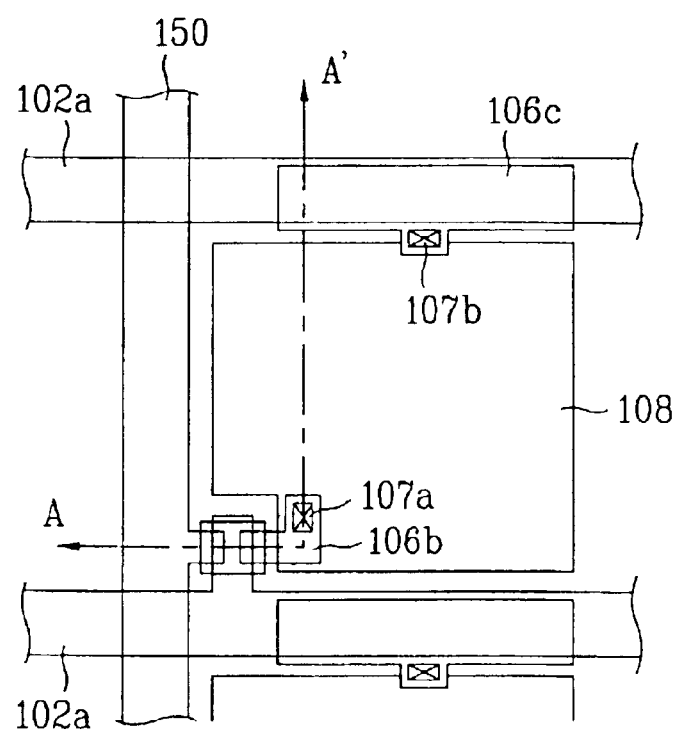
FIG. 1 illustrates a layout of a liquid crystal display device according to a related art.
Figure 2A:
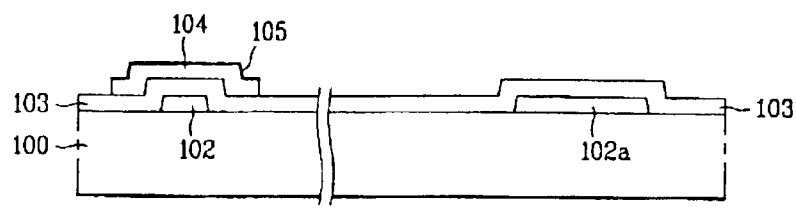
FIGS. 2A to 2D illustrate cross-sectional views of fabricating a liquid crystal display device along a cutting line A–A' in FIG. 1.
Figure 2B:
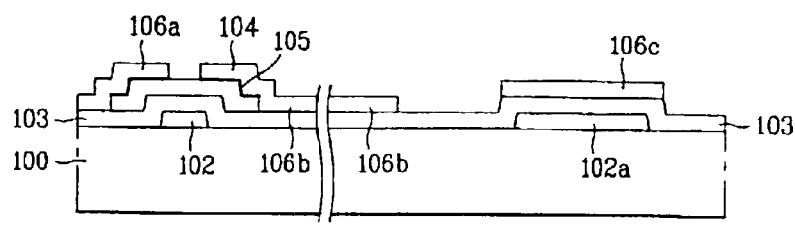
Figure 2C:
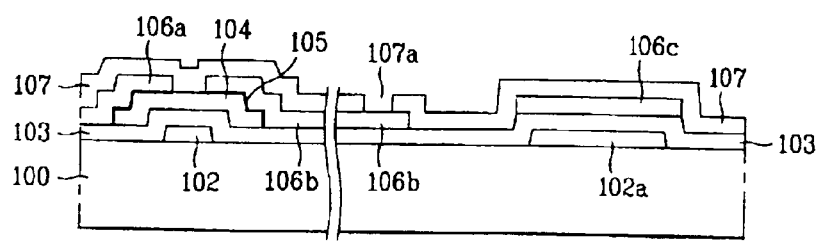
Figure 2D:
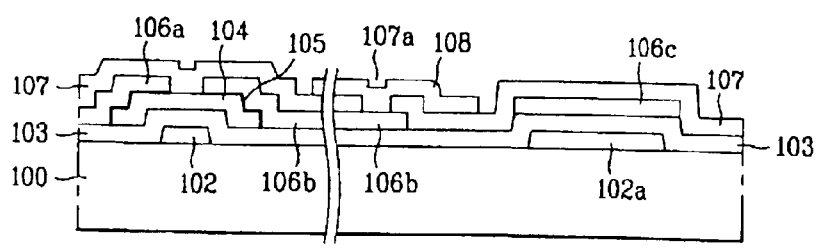
Figure 3:
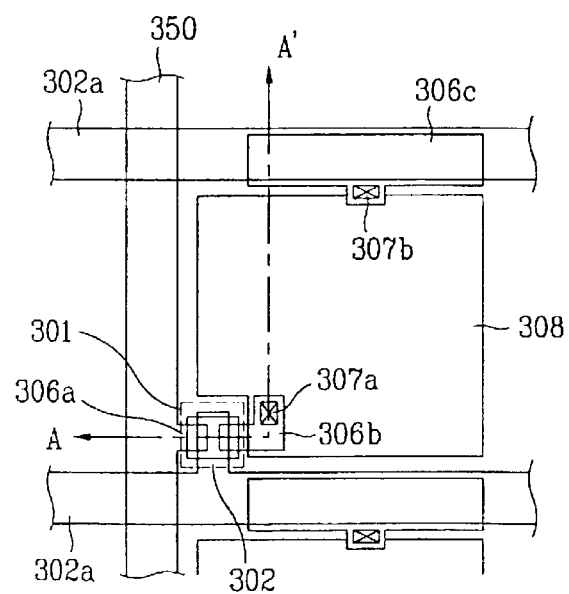
FIG. 3 illustrates a layout of a unit cell of a thin film transistor substrate in a liquid crystal display device according to the present invention.
Figure 4:
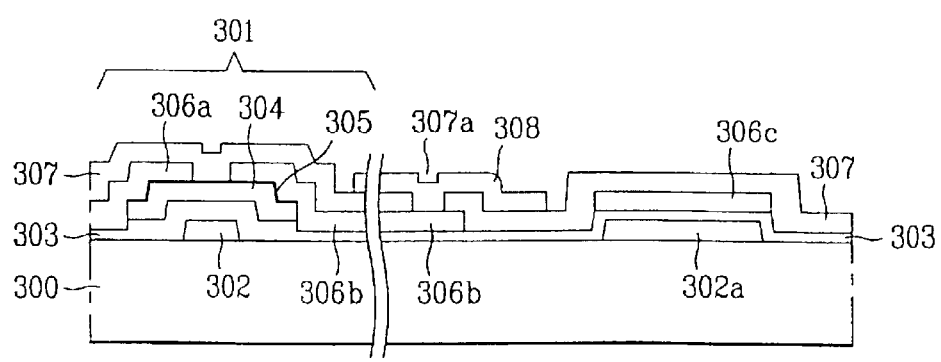
FIG. 4 illustrates a cross-sectional view of a thin film transistor substrate of a liquid crystal display device according to the present invention along a cutting line A–A' in FIG. 3.

FIG. 3 illustrates a layout of a unit cell of a thin film transistor substrate in a liquid crystal display device according to the present invention, FIG. 4 illustrates a cross-sectional view of a thin film transistor substrate of a liquid crystal display device according to the present invention along a cutting line A–A' in FIG. 3, and FIGS. 5A to 5D illustrate cross-sectional views of fabricating a thin film transistor substrate in a liquid crystal display device according to the present invention along a cutting line A–A' in FIG. 3.

Referring to FIG. 3, a thin film transistor substrate of a liquid crystal display device according to the present invention includes gate and data lines 302a and 350 crossing with each other on a glass substrate (not shown), a pixel electrode 308 formed in a pixel area defined by the gate and data lines 302a and 350, a capacitor electrode 306c formed over the gate line 302a, and a thin film transistor 301 formed at an intersection between the gate and data lines 302a and 350.

Moreover, the thin film transistor substrate of the liquid crystal display device according to the present invention further includes a first contact hole 307a connecting electrically the pixel electrode 308 and drain electrode 306b to each other and a second contact hole 307b connecting electrically the pixel electrode 308 and capacitor electrode 306c to each other.

Referring to FIG. 4, the thin film transistor 301 includes a gate electrode 302 on the substrate 300, a gate insulating layer 303 on the gate electrode 302, an active layer 304 on the gate insulating layer 303, an ohmic contact layer 305 on the active layer 304, and source and drain electrodes 306a and 306b on right and left sides of the ohmic contact layer 305, respectively.

The gate insulating layer 303 is formed on the gate line 302a and substrate 300 as well as the gate electrode 302. In this case, a thickness of the portion of gate insulating layer 303 on the gate electrode 302 is thicker than the portion on the gate line 302a or substrate 300 Namely, the gate insulating layer between the gate line 302a and source/drain electrodes 306a/306b is formed thick enough to reduce a parasitic capacitance in the thin film transistor 301, while the other gate insulating layer 303 between the gate line 302a and capacitor electrode 306 is formed thin so as to increase the capacitance of the storage capacitor.

Although not shown in the drawing, a color filter substrate including a black matrix cutting off light leakage, a color filter layer formed on the black matrix, and a common electrode formed on the black matrix and color filter layer is bonded to the thin film transistor substrate.

Figure 5A:
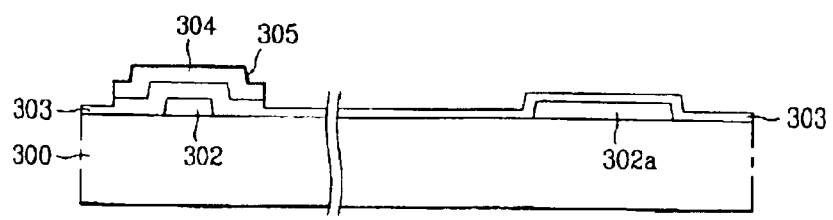
FIGS. 5A to 5D illustrate cross-sectional views of fabricating a thin film transistor substrate in a liquid crystal display device according to the present invention along a cutting line A–A' in FIG. 3.

Referring to FIG. 5A, a gate line forming material of a metal such as Cr, Cu, Al, Mo, and the like is deposited on a substrate 300. A gate electrode 302 and a gate line 302a are then formed by photolithography.

And, a gate insulating layer 300 is formed 4,000 Å thick on an entire surface including the gate electrode 302 and gate line 302a. In this case, the gate insulating layer 303 is formed of an inorganic material such as silicon nitride($SiN_x$) or silicon oxide($SiO_x$) having excellent metal adhesion and being pressure-proof. The gate insulating layer 300 is deposited by PECVD(plasma enhanced chemical vapor deposition).

Subsequently, polysilicon for forming an active layer and a material for forming an ohmic contact layer are deposited successively on the gate insulating layer, and then a photoresist pattern for forming active and ohmic contact layers is formed thereon.

The polysilicon layer and the material layer for forming the ohmic contact layer are patterned using the photoresist pattern. In this case, the polysilicon layer and material layer for forming the ohmic contact layer are removed selectively by dry etching. Hence, an active layer 304 and an ohmic contact layer 305 are formed on the gate insulating layer overlapped with the gate electrode 302.

Thereafter, the gate insulating layer 303 is etched without removing the photoresist pattern. In this case, all portions of the gate insulating layer 303 except the portion under the active layer 304 is further etched. A thickness of the gate insulating layer 303 on the gate line 302a or a thickness of the gate insulating layer 303 on the substrate 300 corresponding to the pixel area is about a half of the thickness of the gate insulating layer 303 under the active layer 304. Particularly, the gate insulating layer on the gate line 302a and substrate 300 is formed about 2,000 Å thick.

Figure 5B:
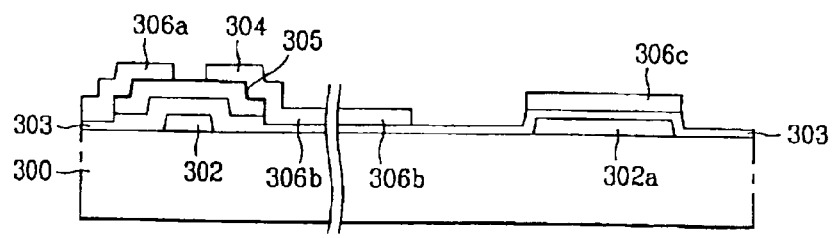

Referring to FIG. 5B, a metal layer is deposited on an entire surface of the structure, and then patterned so as to form data line 350 (see FIG. 3), source and drain electrodes 306a and 306b, and a capacitor electrode 306c.

In this case, the source and drain electrodes 306a and 306b are formed on right and left sides of the ohmic contact layer 305, respectively, and the capacitor electrode 306c is formed on the gate insulating layer 303 which is formed on the gate line 302a. Moreover, the capacitor electrode 306c, gate line 302a, and gate insulating layer 303 between the capacitor electrode 306c and gate line 302a constitute a storage capacitor. Since a thickness of the gate insulating layer 303 of the storage capacitor is reduced to one-half of the thickness of the related art insulating layer, a capacitance of the storage capacitor increases twice as much as the capacitance of the related art device. Therefore, afterimage and flickers on a screen can be reduced.

Figure 5C:
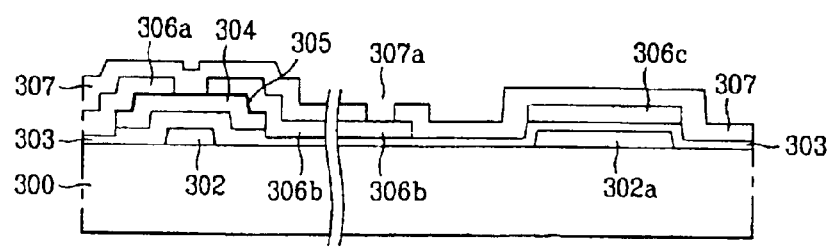

Referring to FIG. 5C, a passivation layer 307 is deposited on an entire surface of the structure so as to protect the thin film transistor, and then selectively removed so as to form first and second contact holes 307a and 307b on the drain and capacitor electrodes 306b and 306c, respectively. In this case, the first contact hole 307a is for connecting electrically the drain and pixel electrodes 306b and 308 to each other, and the second contact hole 307b is for connecting electrically the capacitor and pixel electrodes 306c and 308 to each other.

Figure 5D:
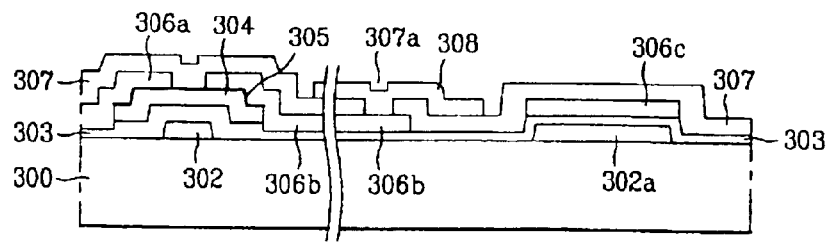

Referring to FIG. 5D, a conductive material of ITO (indium thin oxide) is deposited on an entire surface of the passivation layer 307. In this case, the first and second contact holes 307a and 307b are filled with ITO. Thereafter, the ITO is selectively removed so as to form a pixel electrode 308 in the pixel area.

The above-described liquid crystal display device and fabricating method thereof according to the present invention has the following effect or advantage.

The gate insulating layer of the storage capacitor is formed thin, while the insulating layer of the thin film transistor is formed thick. Hence, the capacitance of the storage capacitor is increased while the parasitic capacitance of the thin film transistor is reduced. Therefore, the present invention enables prevention of the generation of afterimage and flickers on the screen.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   a gate electrode and a gate line on a substrate;
   an insulating layer covering the gate electrode, gate line, and substrate;
   an active layer formed over the gate electrode so as to leave the insulating layer therebetween;
   source and drain electrodes on the active layer;
   a capacitor electrode formed over the gate line;
   a passivation layer on the drain and capacitor electrodes; and
   a pixel electrode connected to the drain electrode wherein a portion of the insulating layer on the gate line is thinner than a portion of the insulating layer on the gate electrode.

2. The liquid crystal display device of claim 1, wherein a thickness of the gate insulating layer under the active layer is twice the thickness of the insulating layer in another area.

3. The liquid crystal display device of claim 2, wherein the insulating layer under the active layer is about 4,000 Å thick.

4. The liquid crystal display device of claim 2, wherein the insulating layer in another area is about 2,000 Å thick.

5. The liquid crystal display device of claim 1, further comprising an ohmic contact layer between the source/drain electrodes and active layer.

6. The liquid crystal display device of claim 1, wherein a thickness of the insulating layer on the gate line is ½ of that on the gate electrode.

7. A method of fabricating a liquid crystal display device, comprising the steps of:
   forming a gate electrode and a gate line on a substrate;
   depositing a gate insulating layer on the gate electrode, gate line, and the substrate;
   forming an active layer on the gate insulating layer over the gate electrode;
   etching the gate insulating layer to a predetermined thickness in all other areas except an area under the active layer; and
   forming source and drain electrodes on the active area and a capacitor electrode on the gate insulating layer over the gate line.

8. The method of claim 7, wherein the gate insulating layer is deposited about 4,000 Å thick.

9. The method of claim 7, the step of forming the active layer, comprising the steps of:

depositing a polysilicon layer on an entire surface of the gate insulating layer;

forming a photoresist pattern on the polysilicon layer; and etching the polysilicon layer selectively using the photoresist pattern as a mask.

10. The method of claim 9, wherein the polysilicon is etched by dry etch.

11. The method of claim 7, wherein the gate insulating layer in all areas except the area under the active layer is etched by dry etch.

12. The method of claim 7, wherein the gate insulating layer in all areas except the area under the active layer is etched so as to be 2,000 Å thick.

13. The method of claim 7, further comprising the step of forming an ohmic contact layer on the active layer.

14. The method of claim 7, further comprising the steps of:

forming a passivation layer on the source, drain, and capacitor electrodes; and forming a pixel electrode on the passivation layer.

15. The method of claim 14, wherein a first contact hole for connecting the drain and pixel electrodes to each other and a second contact hole for connecting the capacitor and pixel electrodes to each other are formed in the passivation layer.

* * * * *